US012579202B1

(12) United States Patent
Babon

(10) Patent No.: US 12,579,202 B1
(45) Date of Patent: Mar. 17, 2026

(54) ALIGNMENT ANALYSIS FOR DETECTING MISINFORMATION IN ONLINE CONTENT

(71) Applicant: Trend Micro Incorporated, Tokyo (JP)

(72) Inventor: Paul Miguel Babon, Mandaluyong (PH)

(73) Assignee: Trend Micro Incorporated, Tokyo (JP)

( * ) Notice: Subject to any disclaimer, the term of this patent is extended or adjusted under 35 U.S.C. 154(b) by 18 days.

(21) Appl. No.: 18/928,425

(22) Filed: Oct. 28, 2024

(51) Int. Cl.
  *G06F 16/953* (2019.01)

(52) U.S. Cl.
  CPC .................................. *G06F 16/953* (2019.01)

(58) Field of Classification Search
  CPC ...................................................... G06F 16/953
  See application file for complete search history.

(56) References Cited

U.S. PATENT DOCUMENTS

| | | | | |
|---|---|---|---|---|
| 8,768,782 | B1 * | 7/2014 | Myslinski | G06F 16/284 705/26.1 |
| 9,189,514 | B1 * | 11/2015 | Myslinski | G06F 16/345 |
| 10,579,921 | B1 * | 3/2020 | Cosic | G06V 20/00 |
| 11,430,065 | B2 * | 8/2022 | Singh | G06F 16/9038 |
| 12,174,903 | B1 * | 12/2024 | Poulis | G06F 16/951 |
| 12,499,321 | B2 * | 12/2025 | Sarkar | G06F 40/35 |
| 2013/0151240 | A1 * | 6/2013 | Myslinski | G06Q 50/01 704/9 |
| 2020/0327120 | A1 * | 10/2020 | Puzis | G06F 16/9532 |
| 2021/0019339 | A1 * | 1/2021 | Ghulati | G06F 40/284 |
| 2021/0089579 | A1 * | 3/2021 | Shu | H04L 51/02 |
| 2021/0279644 | A1 * | 9/2021 | Givental | G06N 3/082 |
| 2021/0281569 | A1 * | 9/2021 | Soon-Shiong | H04L 63/10 |
| 2021/0281592 | A1 * | 9/2021 | Givental | G06N 20/10 |
| 2021/0342704 | A1 * | 11/2021 | Pavlov | G06F 16/313 |
| 2022/0382795 | A1 * | 12/2022 | Sengupta | G06F 18/24137 |
| 2023/0177216 | A1 * | 6/2023 | De Gaetano | G06F 16/93 726/26 |
| 2025/0363525 | A1 * | 11/2025 | Tayeb | G06Q 30/0255 |

OTHER PUBLICATIONS

Xuan Zhang and Wei Gao, "Towards LLM-based Fact Verification on News Claims with a Hierarchical Step-by-Step Prompting Method", School of Computing and Information Systems Singapore Management University, Nov. 1-4, 2023.

(Continued)

*Primary Examiner* — Mark E Hershley

(74) *Attorney, Agent, or Firm* — Beyer Law Group LLP

(57) ABSTRACT

Online content is received in a user computer over the public Internet. A target text of the online content is selected to check for misinformation. A search query is generated using the target text. An online search is performed using the search query to generate a first set of search results. Another online search is performed using an opposite search query, which conveys a meaning that disagrees with the target text, to generate a second set of search results. Misinformation in the online content is detected based on how much the target text aligns with collected online contents from the first and second search results.

9 Claims, 11 Drawing Sheets

(56) References Cited

OTHER PUBLICATIONS

Sewon Min, Kalpesh Krishna, Xinxi Lyu, Mike Lewis, Wen-tau Yih, Pang Wei Koh, Mohit Iyyer, Luke Zettlemoyer, Hannaneh Hajishirzi, "Factscore: Fine-grained Atomic Evaluation of Factual Precision in Long Form Text Generation", Oct. 11, 2023.

Guanghua Li, Wensheng Lu, Wei Zhang, Defu Lian, Kezhong Lu, Rui Mao, Kai Shu, Hao Liao, "Re-Search for The Truth: Multi-round Retrieval-augmented Large Language Models are Strong Fake News Detectors", Mar. 14, 2024.

Xinyi Li, Yongfeng Zhang, Edward C. Malthouse, "Large Language Model Agent for Fake News Detection", Apr. 30, 2024.

Cheng Niu, Yang Guan, Yuanhao Wu, Juno Zhu, Juntong Song, Randy Zhong, Kaihua Zhu, Siliang Xu, Shizhe Diao, and Tong Zhang, "VeraCT Scan: Retrieval-Augmented Fake News Detection with Justifiable Reasoning", Jun. 24, 2024.

"Cerebro Core: A Multimodal AI System in Action", AiFA, https://www.aifalabs.com/cerebro/multimodal-ai-cerebro-core, Downloaded Sep. 30, 2024.

Aaron Edell, "I Trained Fake News Detection AI with >95% Accuracy, and Almost Went Crazy", Medium, https://medium.com/towards-data-science/i-trained-fake-news-detection-ai-with-95-accuracy-and-almost-went-crazy-d10589aa57c, Jan. 11, 2018.

Veritone, "Machine Box, Docs", https://machinebox.io/docslfakebox, Downloaded Oct. 1, 2024.

* cited by examiner

TARGET TEXT
280
Marshall slashes headphone prices up to 50% on select malls in Virginia in the coming summer months!
FIG. 8
281   TEXT FACTOIDS
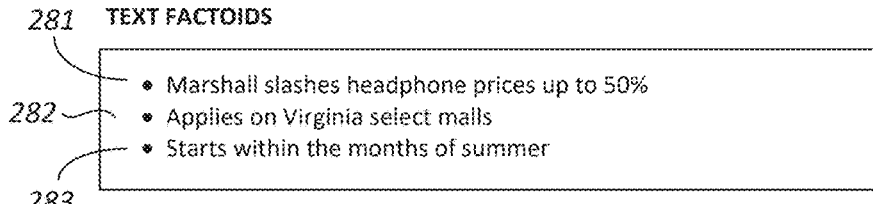
282
283
FIG. 9
NEWS ARTICLE 1 FACTOIDS (Existing CAS: 65% | TAS: 70%, heavily aligns, but no mentions of summer months)
284
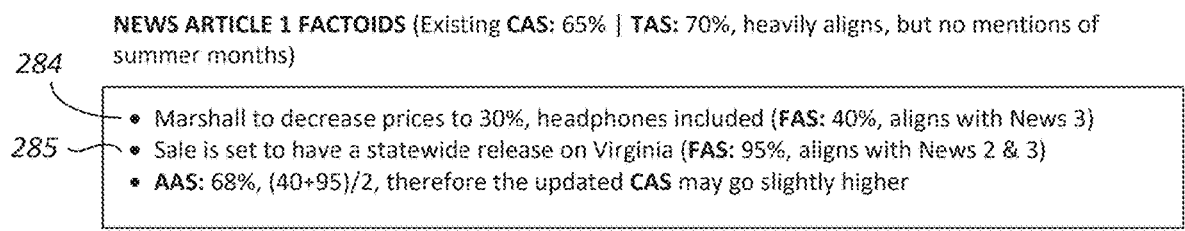
285
FIG. 10

NEWS ARTICLE 2 FACTOIDS (Existing CAS: 70% | TAS: 20%, loosely aligns, discount exists, but not under Marshall)

286

287

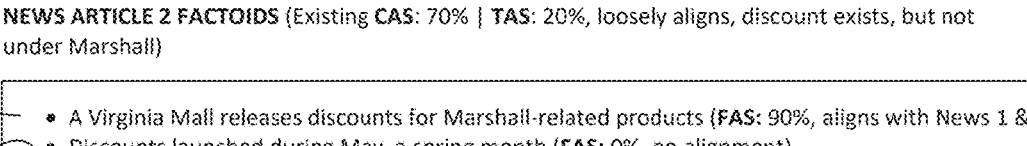

- A Virginia Mall releases discounts for Marshall-related products (FAS: 90%, aligns with News 1 & 3)
- Discounts launched during May, a spring month (FAS: 0%, no alignment)
- AAS: 45%, (90+0)/2, therefore the updated CAS may go slightly lower

FIG. 11

NEWS ARTICLE 3 FACTOIDS (Existing CAS: 95% | TAS: 80%, heavily aligns, but mentions 30% not 50%)

288

289

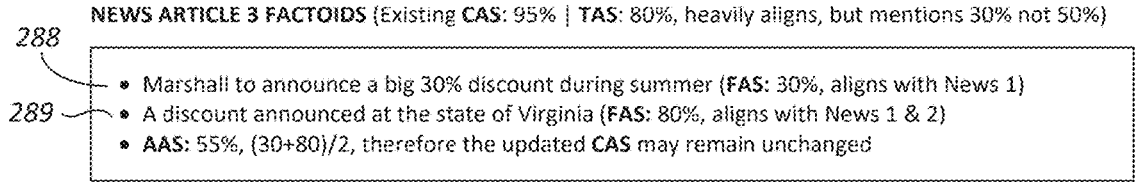

- Marshall to announce a big 30% discount during summer (FAS: 30%, aligns with News 1)
- A discount announced at the state of Virginia (FAS: 80%, aligns with News 1 & 2)
- AAS: 55%, (30+80)/2, therefore the updated CAS may remain unchanged

FIG. 12

SHARED NEWS ARTICLE FACTOIDS (Except for the spring month factoid, all factoids are taken in and combined as they have a high enough FAS)

290

291

292

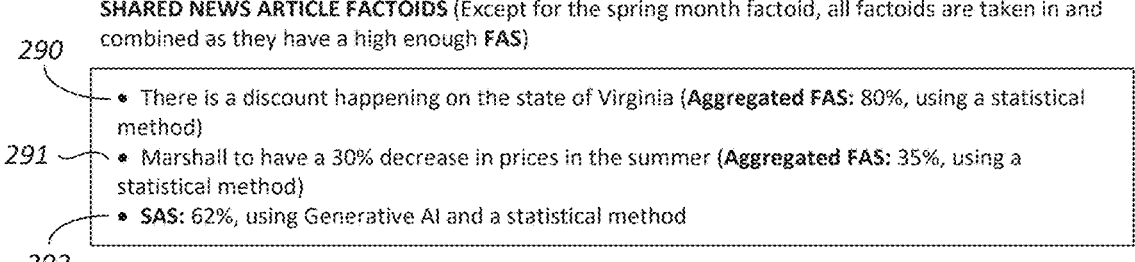

- There is a discount happening on the state of Virginia (Aggregated FAS: 80%, using a statistical method)
- Marshall to have a 30% decrease in prices in the summer (Aggregated FAS: 35%, using a statistical method)
- SAS: 62%, using Generative AI and a statistical method

FIG. 13

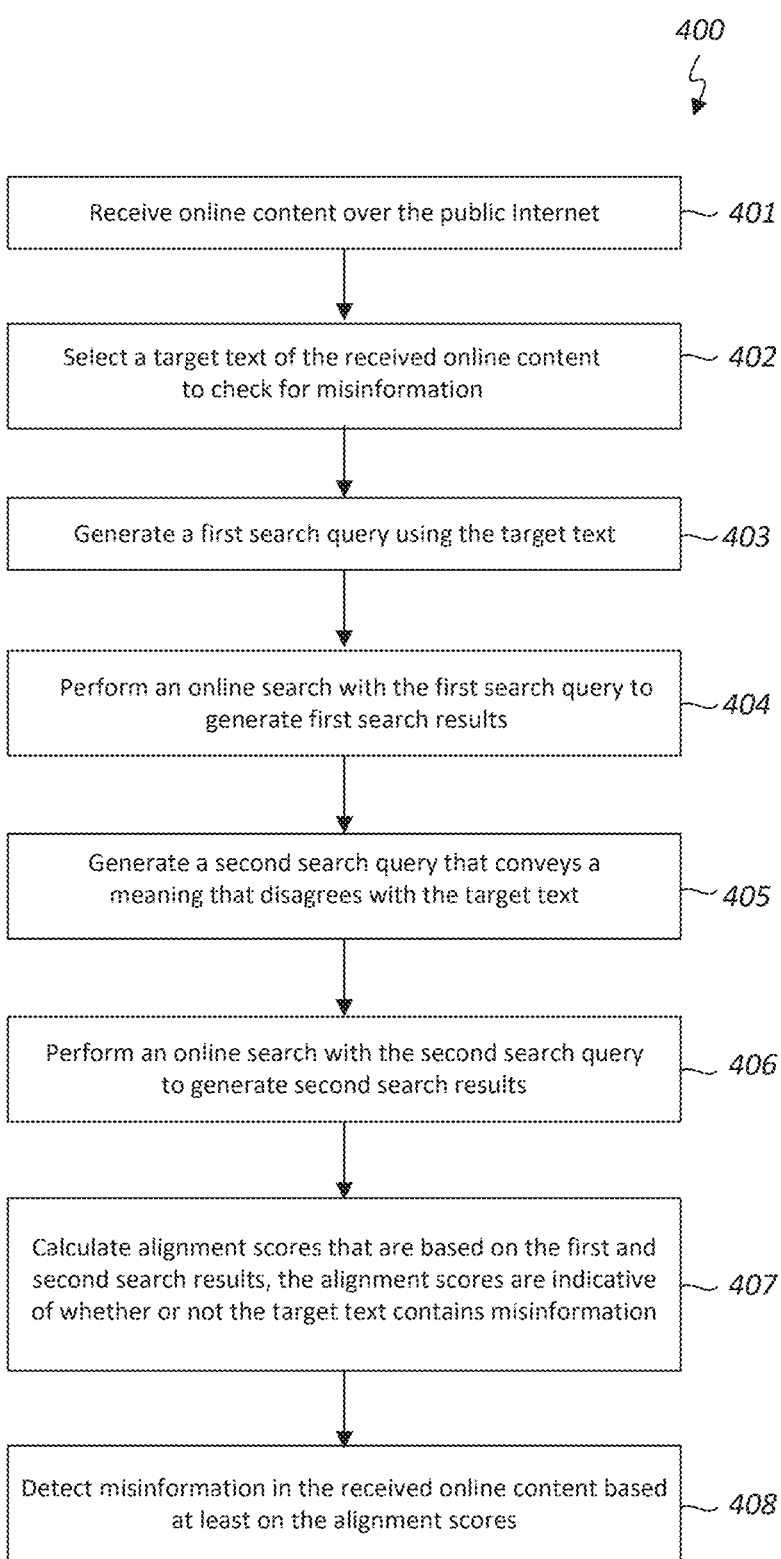

*400*

Receive online content over the public internet ~ *401*

Select a target text of the received online content
to check for misinformation ~ *402*

Generate a first search query using the target text ~ *403*

Perform an online search with the first search query to
generate first search results ~ *404*

Generate a second search query that conveys a
meaning that disagrees with the target text ~ *405*

Perform an online search with the second search query
to generate second search results ~ *406*

Calculate alignment scores that are based on the first and
second search results, the alignment scores are indicative
of whether or not the target text contains misinformation ~ *407*

Detect misinformation in the received online content based
at least on the alignment scores ~ *408*

FIG. 15

ALIGNMENT ANALYSIS FOR DETECTING MISINFORMATION IN ONLINE CONTENT

TECHNICAL FIELD

The present disclosure is directed to cybersecurity.

BACKGROUND

The widespread dissemination of false or misleading information on the public Internet has made it increasingly difficult for users to assess the credibility of online content. With the rapid pace at which information is shared, and the vast amounts of user-generated content, distinguishing between accurate information and misinformation is an escalating challenge. The complexity and volume of online contents, often with conflicting or ambiguous information, make manual verification impractical.

BRIEF SUMMARY

In one embodiment, online content is received in a user computer over the public Internet. A target text of the online content is selected to check for misinformation. A search query is generated using the target text. An online search is performed using the search query to generate a first set of search results. Another online search is performed using an opposite search query, which conveys a meaning that disagrees with the target text, to generate a second set of search results. Misinformation in the online content is detected based at least on how much the target text aligns with collected online contents from the first and second search results.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 8-13 illustrate an example operation of detecting misinformation in online content, in accordance with an embodiment of the present invention.

FIG. 15 shows a flowchart of a method of detecting misinformation in online content, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
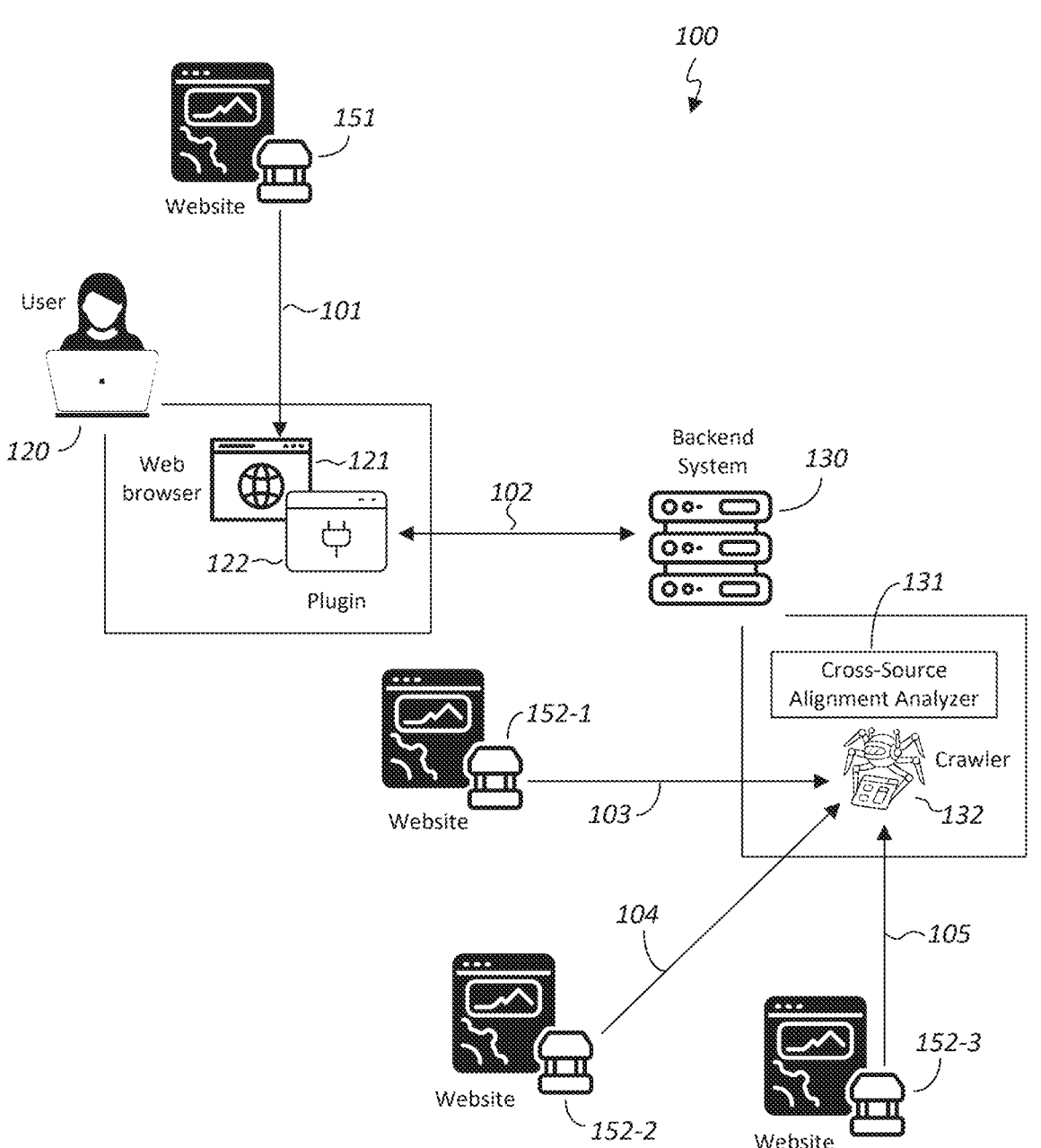
FIG. 1 shows a block diagram of a system for detecting misinformation in online content, in accordance with an embodiment of the present invention.

FIG. 1 shows a block diagram of a system 100 for detecting misinformation in online content, in accordance with an embodiment of the present invention. In the example of FIG. 1, the system comprises a user computer 120 and a backend system 130. The user computer 120 may be a laptop, desktop computer, or other computer that is employed by a user to access websites on the public Internet. The user computer 120 runs a web browser 121 to receive one or more webpages from a website.

Misinformation abounds on the public Internet. This problem is exacerbated by the case with which misinformation can spread and the use of generative artificial intelligence (AI) to make misinformation more believable. Manually checking online content, such as content of a webpage or social media post, for misinformation is not practically feasible due to the vast amount of information available on the public Internet and the subtle nature of some misinformation.

A backend system 130 may include a dedicated server, interconnected servers, a cloud computing platform (e.g., Amazon Web Services (AWS)™), or another computer system with at least one processor that executes the instructions of a cross-source alignment analyzer 131. The alignment analyzer 131 comprises one or more software modules configured to detect misinformation in a target online content by analyzing the alignment of the target online content with contents of a plurality of websites. In other words, the alignment analyzer 131 determines how closely or accurately the contents of the websites match or agree with the target online content. To detect misinformation, the alignment analyzer 131 may perform a plurality of different alignment calculations.

In an example operation, the web browser 121 renders the content of a webpage received from a website 151 (see arrow 101). A browser plugin 122, functioning in conjunction with the web browser 121, allows the user to highlight text on the webpage. The browser plugin 122 then forwards the highlighted text to the backend system 130 (see arrow 102). In the backend system 130, the alignment analyzer 131 receives the highlighted text and analyzes its alignment with contents from multiple websites 152 (e.g., 152-1, 152-2, 152-3, etc.). These websites 152 are distinct from one another, with some having content that agrees with the highlighted text, and others having content that disagrees with the highlighted text. More specifically, in one embodiment, the alignment analyzer 131 includes a crawler 132 that searches the public Internet for contents that agree with the highlighted text and contents that disagree with the highlighted text, and scrapes the agreeing and disagreeing contents from corresponding websites (see arrows 103-105). The alignment analyzer 131 analyzes the scraped contents for alignment with the highlighted text and generates a corresponding summary with results that are indicative of whether or not the highlighted text contains misinformation. The summary may include a text alignment score that indicates how well the highlighted text agree with online content of a particular website 152; a shared alignment score that indicates how well the contents from the websites 152, collectively, agree with the highlighted text; and other alignment analysis results. The summary advantageously facilitates decision making as to whether or not the highlighted text contains misinformation.

Figure 2:
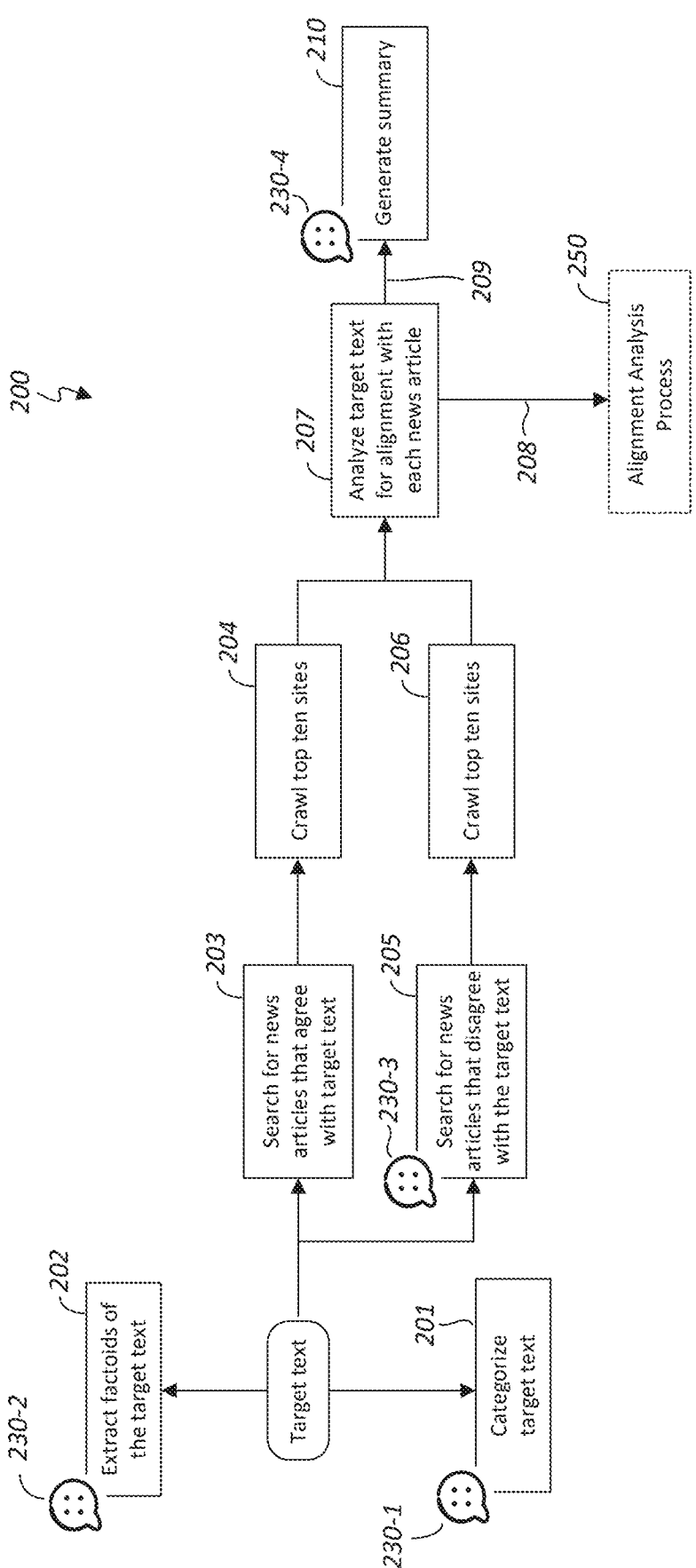
FIGS. 2 and 3 show a flow diagram of a method of detecting misinformation in online content, in accordance with an embodiment of the present invention.
Figure 3:
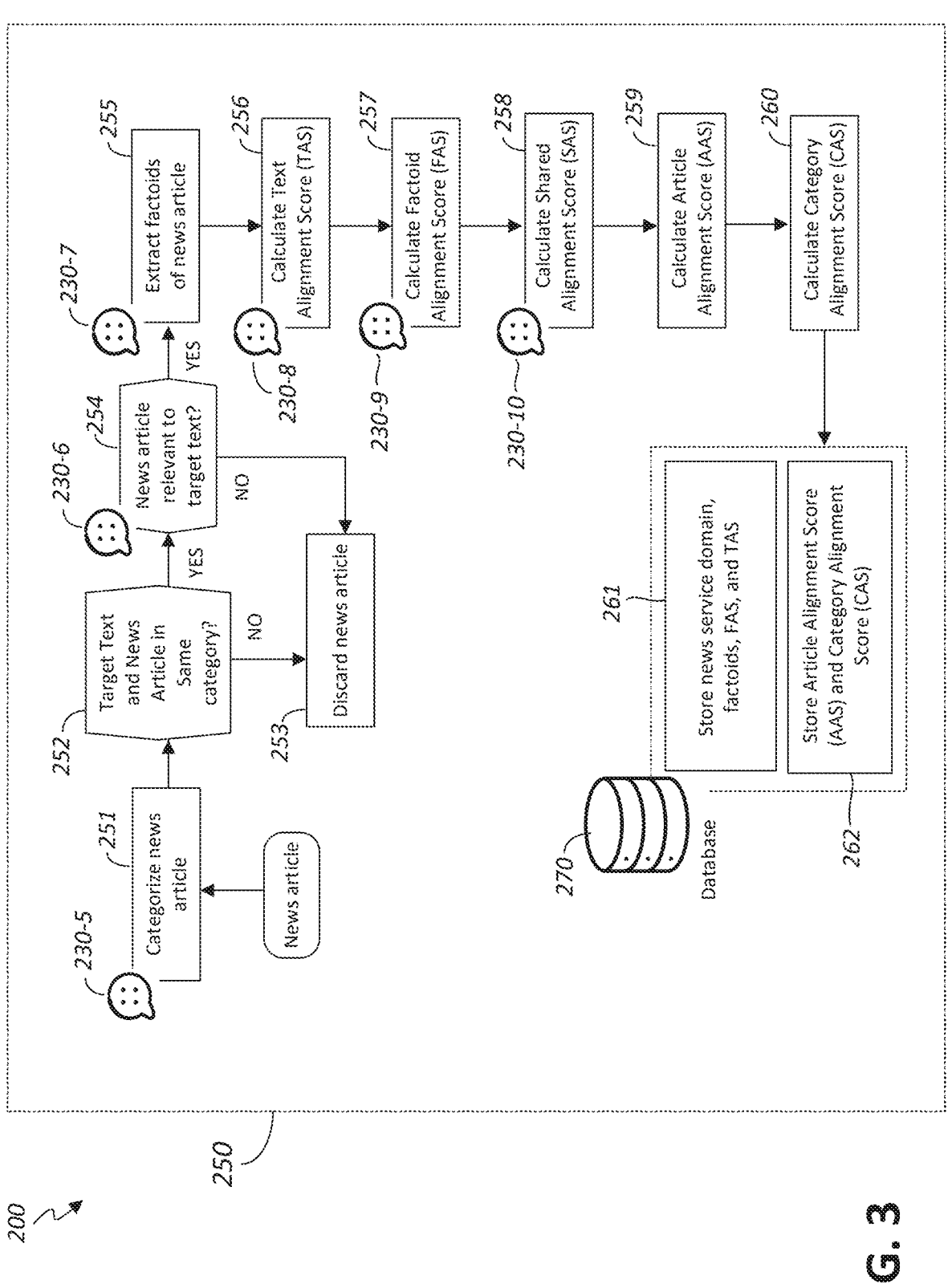

FIGS. 2 and 3 show a flow diagram of a method 200 of detecting misinformation in online content, in accordance with an embodiment of the present invention. The method 200 may be performed by the backend system 130 as programmed with the alignment analyzer 131. The method 200 is explained in the context of news articles for illustration purposes only. As can be appreciated, the method 200 may also be performed to detect misinformation in other online content, such as social media postings.

Starting in FIG. 2, a target text is received by the backend system 130 from the user computer 120 over the public Internet. The target text comprises selected (e.g., highlighted) text of an online content that the user read from a webpage of a website on the public Internet.

In one embodiment, the alignment analyzer 131 includes one or more models 230 (i.e., 230-1, 230-2, 230-3, etc.). The models 230 may be Large Language Models (LLMs), generative AI models, or other suitable machine learning models. The models 230 are optimized to perform functionality as described herein by fine-tuning, prompt engineering, or other model optimization technique. The models 230 may embody varying techniques, such as semantic analysis, semantic textual similarity, and natural language inference. A generative AI model may be used in conjunction with a model 230 in situations where the model 230 does not produce a satisfactory result. Statistical methods may also be used to fine-tune the outputs of the models 230.

In step 201, a semantic analysis (SA) model 230-1 determines a category for the target text using semantic analysis. Semantic analysis is the process of finding meaning or intent in a sample text. The SA model 230-1 can be fine-tuned to categorize texts based on common news categories. In one embodiment, the SA model 230-1 categorizes the target text into one of the following categories: health, politics, science, or entertainment. Categories may be added or removed to meet specific cybersecurity requirements. The SA model 230-1 outputs a category score for each defined category. A category is selected if the highest category score meets a defined threshold. In cases where the SA model 230-1 cannot determine a category for the target text because the highest category score is below the threshold, or each category has the same category score, a generative AI model may be used to perform the categorization by defining the system prompt of the generative AI to return any one of the categories that is most appropriate given the target text.

Target texts, news articles, or other texts have constituent facts that are referred to as "factoids". Generally, factoids are small, discrete pieces of factual information or claims in texts. These factoids can be statements of fact, data points, or assertions made within the texts. In step 202, a generative AI model 230-2 extracts a set of factoids from the target text by defining its system prompt to extract an arbitrary number of facts from the target text. The target text may be a whole paragraph which could include multiple assumptions that are extracted as factoids.

In step 203, a search application programming interface (API) of a conventional search engine is used to search the public Internet for news articles that agree with the target text. The target text may be formed into a search query that retains most of the relevant phrases of the target text to increase the accuracy of the search results. The search results from step 203 are also referred to herein as "positive search results."

In step 204, the top 10 websites in the positive search results are crawled and scraped for the following information: domain name of the website, name of the news service that operates the website, date of the news article, headline of the news article, the body of the news article, and sources noted in the news article. The number of websites in the positive search results selected for further processing may be adjusted to meet particulars of a cybersecurity application.

In step 205, the search API of the conventional search engine is used to search the public Internet for news articles that disagree with the target text. In one embodiment, a generative AI model 230-3 transforms the target text into a form that disagrees with the target text. In other words, the generative AI model 230-3 generates a search query that reflects a contradictory interpretation of the target text. For example, if the target text is "vaccines can help reduce the risk of COVID-19," the generative AI model 230-3 converts it to "vaccines can increase the risk of COVID-19." As another example, a target text like "iPhone 16 prices starts at $499" may be converted by the generative AI model 230-3 to "iPhone 16 starts at [actual price]", with the [actual price] disagreeing with that in the target text. The search query with a contradictory interpretation of the target text is used to search the public Internet to generate search results, which are also referred to herein as "negative search results." Generating positive and negative search results advantageously prevents bias of a search algorithm, if present, and ensures that the alignment analysis is not fully controlled by the limited number of search results returned by the search engine.

In step 206, the top 10 websites in the negative search results are crawled and scraped for the following information: domain name of the website, name of the news service that maintains the website, date of the news article, headline of the news article, the body of the news article, and sources noted in the news article. The number of websites in the negative search results selected for further processing may be adjusted to meet particulars of a cybersecurity application.

In step 207, each news article from the selected websites, i.e., the top 10 websites in the positive search results and the top 10 websites in the negative search results, is subjected to an alignment analysis process 250 (see arrow 208). As will be more apparent below, the alignment analysis process 250 analyses the target text and news articles from the selected websites to generate indicators of whether the target text contains misinformation. The news articles from the selected websites are also collectively referred to herein as "collected news articles."

Referring to FIG. 3, the process 250 begins, in step 251, by categorizing a news article of the collected news articles. In one embodiment, an SA model 230-5 categorizes the news article into one of the following categories: health, politics, science, or entertainment. The SA model 230-5 may be augmented with a generative AI model if it cannot find a suitable category.

From step 252 to step 253, the news article is removed from further consideration when the news article and the target text are not in the same category.

From step 254 to step 253, the news article is removed from further consideration when the news article is not relevant to the target text. Although the news article may appear in search results, it is possible that it is not actually relevant to the target text and only contains matching keywords. In one embodiment, a semantic textual similarity (STS) model 230-6 verifies that the content of the news article is relevant to the target text using semantic textual similarity. Semantic textual similarity is the process of measuring the similarity of two texts, not just in terms of keyword matching, but also in terms of contextual meaning. The STS model 230-6 returns an STS score between 0 and 1, defining the degree of similarity. The news article is deemed relevant if its STS score with the target text meets a defined threshold. However, if the STS model 230-6 is not confident on whether a news article is relevant or irrelevant to the target text (e.g., yielding an STS score of 0.5), a generative AI model may be used by defining its system prompt to return a "0" if the news article is irrelevant to the target text, or a "1" if the news article is relevant to the target text.

In step 255, when the news article is in the same category as the target text and is relevant to the target text, the news article is processed through by extracting and collecting factoids of the news article. It is to be noted that even when a news article is relevant to the target text, some factoids may not be related to the news article's main topic. For faster processing, the number of factoids to be collected may be predetermined. In one embodiment, a generative AI model 230-7 extracts the factoids of the news article and selects a predetermined number of factoids to represent the news article.

In step 256, a text alignment score (TAS) is calculated for the news article. A text alignment score is a measure of how closely the news article aligns with the target text. Inconsistencies, missing contexts, and the way names are mentioned/spelled can affect the text alignment score. In one embodiment, the factoids of the news article and the factoids of the target text are input to a natural language inference (NLI) model 230-8, which compares the factoids to generate the text alignment score using natural language inference. Natural language inference is the process of determining the relationship of two sample texts. By default, an NLI process outputs a score that indicates how much the two texts contradict (contradiction), how much they are unrelated (neutral), and how much they support each other (entailment). However, in one embodiment, the NLI model 230-8 is trained to output a single score between 0 and 1, with 0 denoting complete contradiction and 1 denoting complete entailment.

The text alignment score, as output by the NLI model 230-8, is a numerical indicator of similarities between factoids of the news article and factoids of the target text. In cases where the NLI model 230-8 denotes possible neutrality (e.g. score of 0.5), a generative AI model may be used to generate the text alignment score. The system prompt to the generative AI model may be defined to give a decimal value between 0 and 1 to determine how much the factoids of the target text and the news article align with each other. The output of the NLI model 230-8 or the generative AI model may be refined by statistical methods for consistency with other alignment scores disclosed herein. The text alignment score may be normalized into a range of values. In one embodiment, the text alignment score ranges from 0% to 100%, with 0% indicating that the news article completely disagrees with the target text, and 100% indicating that the news article completely agrees with the target text.

In step 257, a factoid alignment score (FAS) is calculated for the news article. A factoid alignment score is a measure of how closely the news article aligns with other news articles of the collected news articles. The step 257 may be repeated as news articles are subjected to the process 250 such that every factoid of every news article of the collected news articles has a factoid alignment score. In one embodiment, the factoids of the news article and the factoids of the other news articles of the collected news articles are input to an NLI model 230-9, or to a generative AI model if the NLI model 230-9 returns possible neutrality, which compares the factoids to generate the factoid alignment score of the news article. The factoid alignment score, as output by the NLI model 230-9 or the generative AI model, is a numerical indicator of similarities between factoids of the news article and the factoids of the other news articles of the collected news articles. The output of the NLI model 230-9 or the generative AI model may be refined by statistical methods for consistency with other alignment scores disclosed herein. The factoid alignment score may also be adjusted based on the category alignment score of the corresponding news article. A lower category alignment score could lower the factoid alignment score, and a higher category alignment score could increase the factoid alignment score. The factoid alignment score may be normalized into a range of values. In one embodiment, the factoid alignment score ranges from 0% to 100%, with 0% indicating that the news article completely disagrees with the other news articles of the collected news articles, and 100% indicating that the news article completely agrees with the other news articles of the collected news articles.

In step 258, a shared alignment score (SAS) is calculated for the target text. A shared alignment score is a measure of how closely the target text aligns with the collected news articles as a group (i.e., collectively). In one embodiment, to facilitate calculation of the shared alignment score, a set of similar factoids are selected from factoids of the collected news articles. The set of similar factoids are factoids that are similar based on their corresponding factoid alignment scores. In one embodiment, the factoids of the target text and the set of similar factoids are input to an NLI model 230-10, or to a generative AI model if the NLI model 230-10 returns a possible neutrality, which compares the factoids of the target text to the set of similar factoids to generate the shared alignment score. The shared alignment score, as output by the NLI model 230-10 or by the generative AI model, is a numerical indicator of similarities between factoids of the target text and the set of similar factoids. The output of the NLI model 230-10 or the generative AI model may be refined by statistical methods for consistency with other alignment scores disclosed herein. The shared alignment score may be normalized into a range of values. In one embodiment, the shared alignment score ranges from 0% to 100%, with 0% indicating that the collected news articles as a group completely disagrees with the target text, and 100% indicating that the collected news articles as a group completely agrees with the target text.

In step 259, an article alignment score (AAS) is calculated for the news article. As can be appreciated, the same news article may appear in different search results for different target texts. The article alignment score is a measure of how closely the news article aligns with different target texts. The article alignment score may be calculated by aggregating (e.g., by averaging) the factoid alignment scores of the news article over time.

In step 260, a category alignment score (CAS) is calculated for the category of the news service that published the news article. A category alignment score is a measure of how closely news articles from a specific category of the news service align with news articles from other news services in the same category. The category alignment score allows a factoid alignment score of a new article to be adjusted to take into consideration the news service that published the news article in the category. The category alignment score may be calculated by aggregating (e.g., averaging) the factoid alignment score of the news article with the existing category alignment score of the news service in the same category. Calculating alignment scores by category is advantageous because a news service may be reliable in one category but not in others.

In one embodiment, the backend system 130 includes a database 270 that stores alignment calculation results and other relevant information regarding news articles and target texts that have been processed by the backend system 130. In step 261, the domain of the news service that published the news article, the factoids and factoid alignment score of each of the collected news articles, and the text alignment score of the news article are stored in the database 270. The database 270 serves as cache to allow skipping of the process 250 for the same target text. In step 262, the article alignment score of the news article and category alignment score calculated for the category of the news service that published the news article are stored in the database 270.

Referring back to FIG. 2, in step 210, a generative AI model 230-4 generates a summary of the results of the alignment analysis process 250 for all of the collected news articles (see arrow 209). The summary may indicate the text alignment score of each of the collected news articles. The summary may also indicate the shared alignment score of the collected news articles, category alignment scores of the news services of the collected news articles, and other results of the alignment analysis process 250. The summary may also include an interpretation of the shared alignment score. The generative AI model 230-4 may be configured to convey a conclusion that the collected news articles do not align with the target text if the shared alignment score is low, and to conclude alignment if the score is high, with the addition of providing reasons for its scoring based on the differences between similar factoids and the text factoids. The summary may also include an interpretation of the text alignment score of each article. The generative AI model 230-4 may be configured to convey a conclusion that an article does not align with the target text if its text alignment score is low, and to conclude alignment if the shared alignment score is high, with the addition of providing reasons for its scoring based on the differences between the article factoids and text factoids. The summary advantageously provides information that facilitates making an informed decision as to whether the target text contains misinformation. One or more results on the summary may be displayed and presented to the user.

FIGS. 4-7 pictorially illustrate the relationships between factoids, target text, and news articles, in accordance with an embodiment of the present invention.

Figure 4:
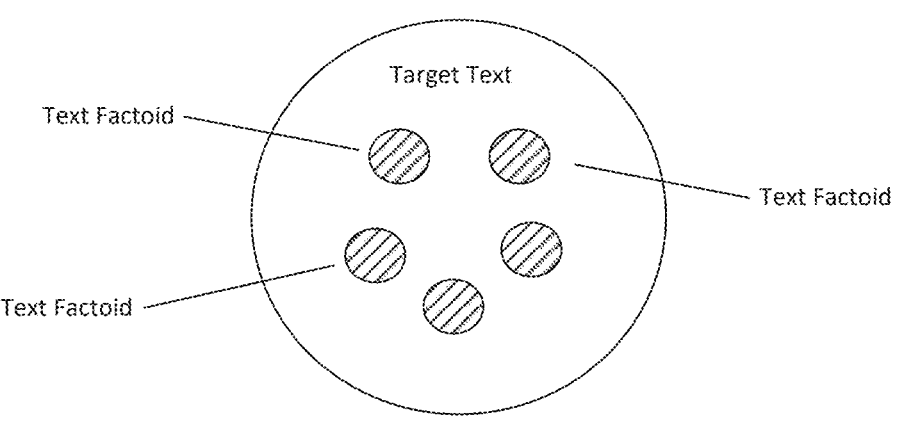
FIGS. 4-7 pictorially illustrate the relationships between factoids, target text, and news articles, in accordance with an embodiment of the present invention.

As shown in FIG. 4, a target text has a plurality of factoids ("text factoid").

Figure 5:
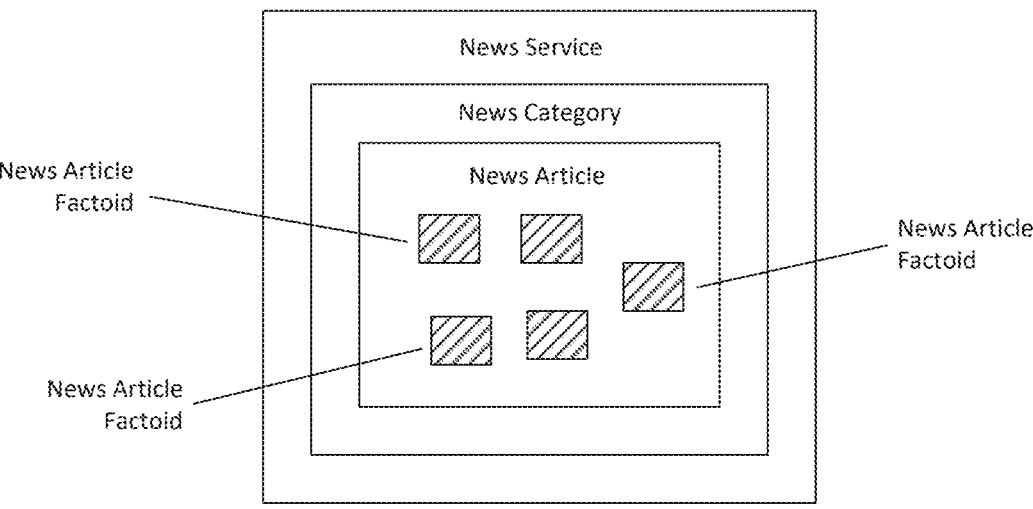

As shown in FIG. 5, a news article has a plurality of factoids ("news article factoid"). A news service may publish news articles in different categories. A news article belongs to a news category of the news service.

Figure 6:
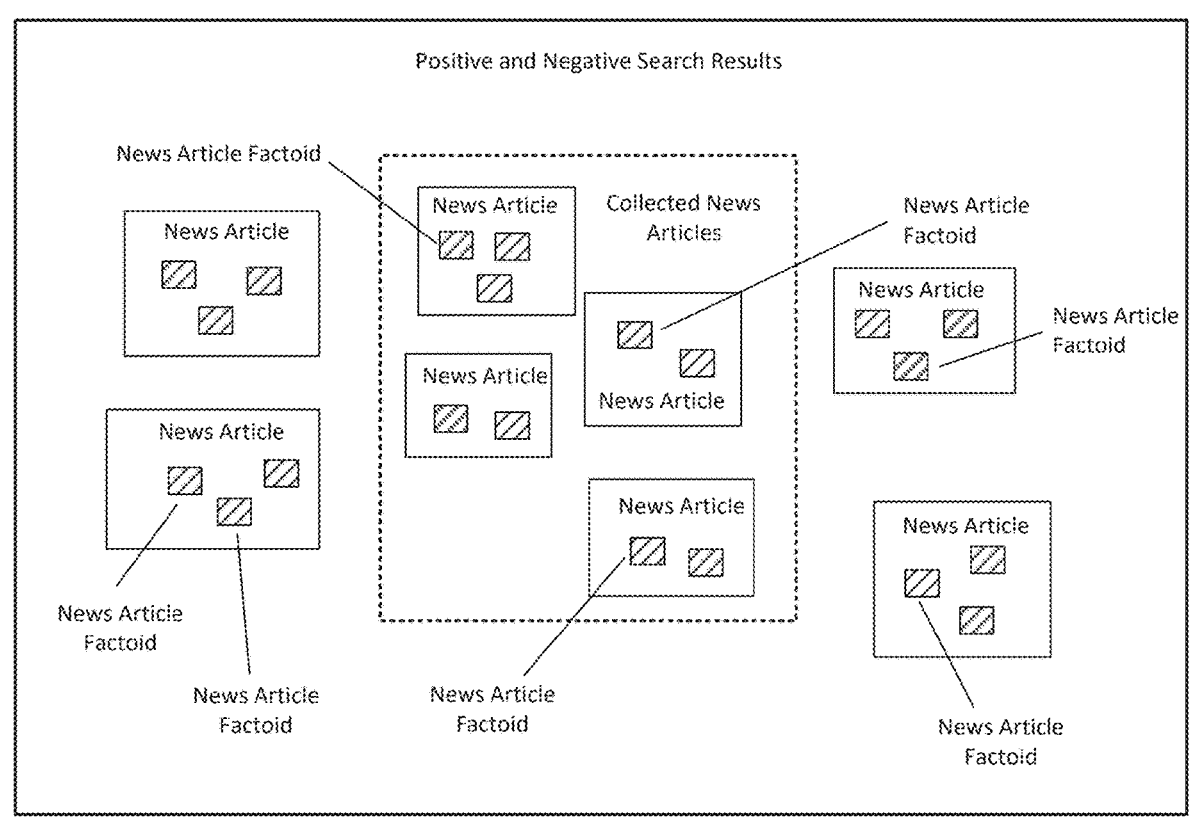

As shown in FIG. 6, positive and negative search results include a plurality of news articles published by corresponding news services on their websites. The collected news articles, each of which includes a plurality of factoids, are the news articles from the positive and negative search results that have been selected for alignment analysis.

Figure 7:
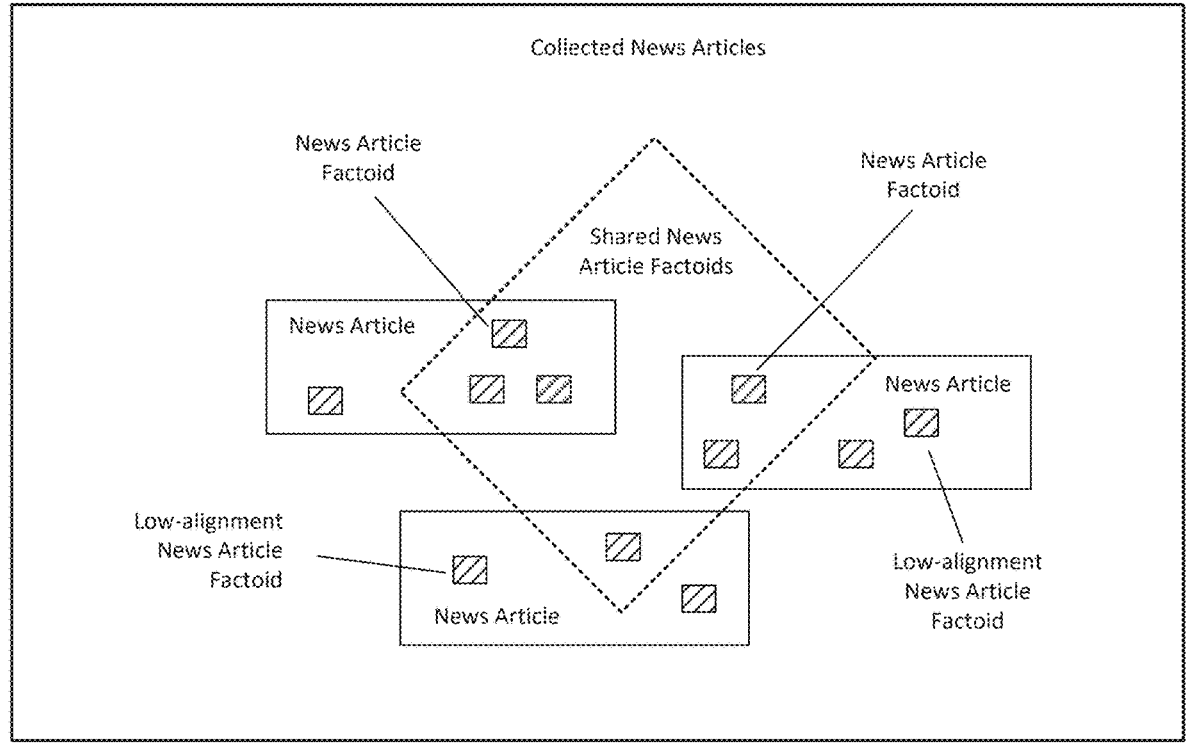

As shown in FIG. 7, factoids of collected news articles that are similar to each other are shared factoids ("shared news article factoids"). More particularly, a plurality of similar factoids may be shared by a set of news articles of the collected news articles. Factoids that are outside the boundary of shared news article factoids are low-alignment factoids.

An example operation of the backend system 130 is now explained with reference to FIGS. 8-13. Only three news articles are included in the example of FIGS. 8-13 for clarity of illustration.

Starting with FIG. 8, there is shown an example target text 280 with information that the Marshall department store is slashing prices on headphones. FIG. 9 shows factoids 281-283 extracted from the target text 280.

FIG. 10 shows factoids 284 and 285 of a first news article of collected news articles gathered by the backend system 130 from search results. Each of the factoids are shown with its corresponding factoid alignment score (FAS). Each news article has an existing, corresponding category alignment score (CAS) in the database 270, which is 65% for the first news article. The first news article has a text alignment score (TAS) of 70%, meaning it heavily aligns with the target text. The first news article has a relatively high article alignment score (AAS) of 68%, meaning its updated category alignment score (CAS) may go higher.

FIG. 11 shows factoids 286 and 287 of a second news article of the collected news articles gathered by the backend system 130 from search results. Each of the factoids are shown with its corresponding factoid alignment score. The second news article has an existing, corresponding category alignment score of 70% in the database 270. The second news article has a text alignment score of 20%, meaning it does not closely align with the target text. The second news article has a relatively low article alignment score of 45%, meaning its updated category alignment score may go slightly lower.

FIG. 12 shows factoids 288 and 289 of a third news article of the collected news articles gathered by the backend system 130 from search results. Each of the factoids are shown with its corresponding factoid alignment score. The third news article has an existing, corresponding category alignment score of 95% in the database 270. The third news article has a text alignment score of 80%, meaning it closely aligns with the target text. The third news article has an average article alignment score of 55%, meaning its current category alignment score may not change when updated.

FIG. 13 shows similar factoids 290 and 291 that are shared among the first, second, and third news articles. The similar factoids result in a shared alignment score (SAS) of 62% (FIG. 13, 292), which is above average.

Figure 14:
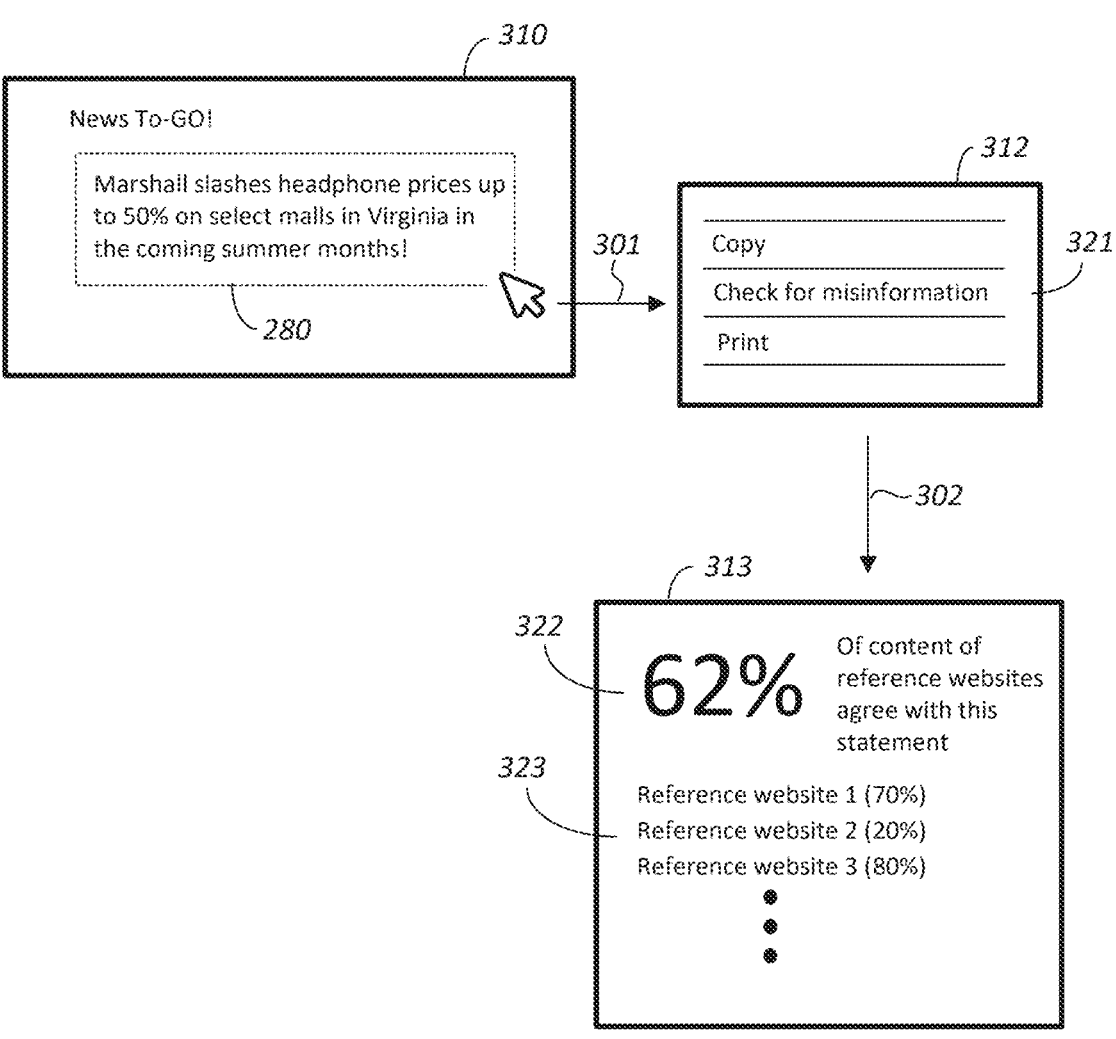
FIG. 14 pictorially illustrates the example operation of FIGS. 8-13.

FIG. 14 pictorially illustrates the example of FIGS. 8-13. In the example of FIG. 14, a window 310 of the web browser 121 displays the content of a webpage received from the website 151 (shown in FIG. 1). The user highlights the target text 280 (also shown in FIG. 8) that is displayed in the window 310, and right-clicks the target text 280 with a mouse to cause the plugin 122 to display a window 312 (see arrow 301). The window 312 includes several options including checking the target text 280 for misinformation (see FIG. 14, 321). The user selects the option to check the target text 280 for misinformation, thereby causing the plugin 122 to forward the target text 280 to the backend system 130. The backend system 130 analyzes the target text 280 for alignment with collected news articles, which includes calculating various alignment scores that are indicative of whether or not the target text contains misinformation.

The plugin 122 receives from the backend system 130 a summary of results of the alignment analysis of the target text 280. The plugin 122 displays portions of the summary in a window 313 (see arrow 302). In the example of FIG. 14, The window 313 displays the shared alignment score from the summary. In the example of FIG. 14, the shared alignment score is 62% (FIG. 13, 292; FIG. 14, 322), indicating that 62% of the collected news articles as a group agrees with the target text 280. The window 313 also displays the text alignment score of each of the collected news articles relative to the highlighted text by source (FIG. 14, 323).

As can be appreciated, misinformation in online content may be detected from the summary as displayed in the window 313. For example, the target text 280 may be considered reliable when the shared alignment score is equal to or exceeds a reliability threshold. Otherwise, the target text 311 may be considered misinformation when the shared alignment score is below the threshold. The comparison may be performed by a script or other program code. As another example, all of the results in the summary may be input to a generative AI model, which can then decide as to whether or not the target text 280 is misinformation. The user by herself may also make an informed decision as to whether or not the highlighted text is misinformation based on displayed portions of the summary.

FIG. 15 shows a flowchart of a method 400 of detecting misinformation in online content, in accordance with an embodiment of the present invention.

In step 401, a user computer receives online content over the public Internet. The online content may be a news article, a social media posting, or other text-based content that may be received over the public Internet. The online content may be in a webpage that is rendered by a web browser that is running on the user computer. The online content may also be received by a dedicated client software of the source of the online content, such as an app of a social media site.

In step 402, a text of the received online content, referred to herein as "target text", is selected to check for misinformation. The target text may be selected responsive to the user highlighting the target text.

In step 403, a first search query is generated using the target text.

In step 404, an online search using a search engine is performed with the first search query to generate a first set of search results that are responsive to the first search query.

In step 405, a second search query that conveys a meaning that disagrees with the target text is generated.

In step 406, an online search using the search engine is performed with the second search query to generate a second set of search results.

In step 407, alignment scores are calculated based on the first and second search results. In one embodiment, a text alignment score is calculated for each of online contents of corresponding websites in the first and second sets of search results. A text alignment score indicates a degree by which a collected online content aligns with the target text. A shared alignment score may also be calculated for all of the online contents collectively. More particularly, the shared alignment score indicates a degree by which the collected online contents as a group aligns with the target text. The online contents may be news articles collected from websites of news services, for example.

In step 408, misinformation in the received online content is detected based at least on the alignment scores of the collected online contents. For example, the alignment scores may be evaluated by an NLI model, generative AI model, or program code to determine whether or not the target text is misinformation.

Figure 16:
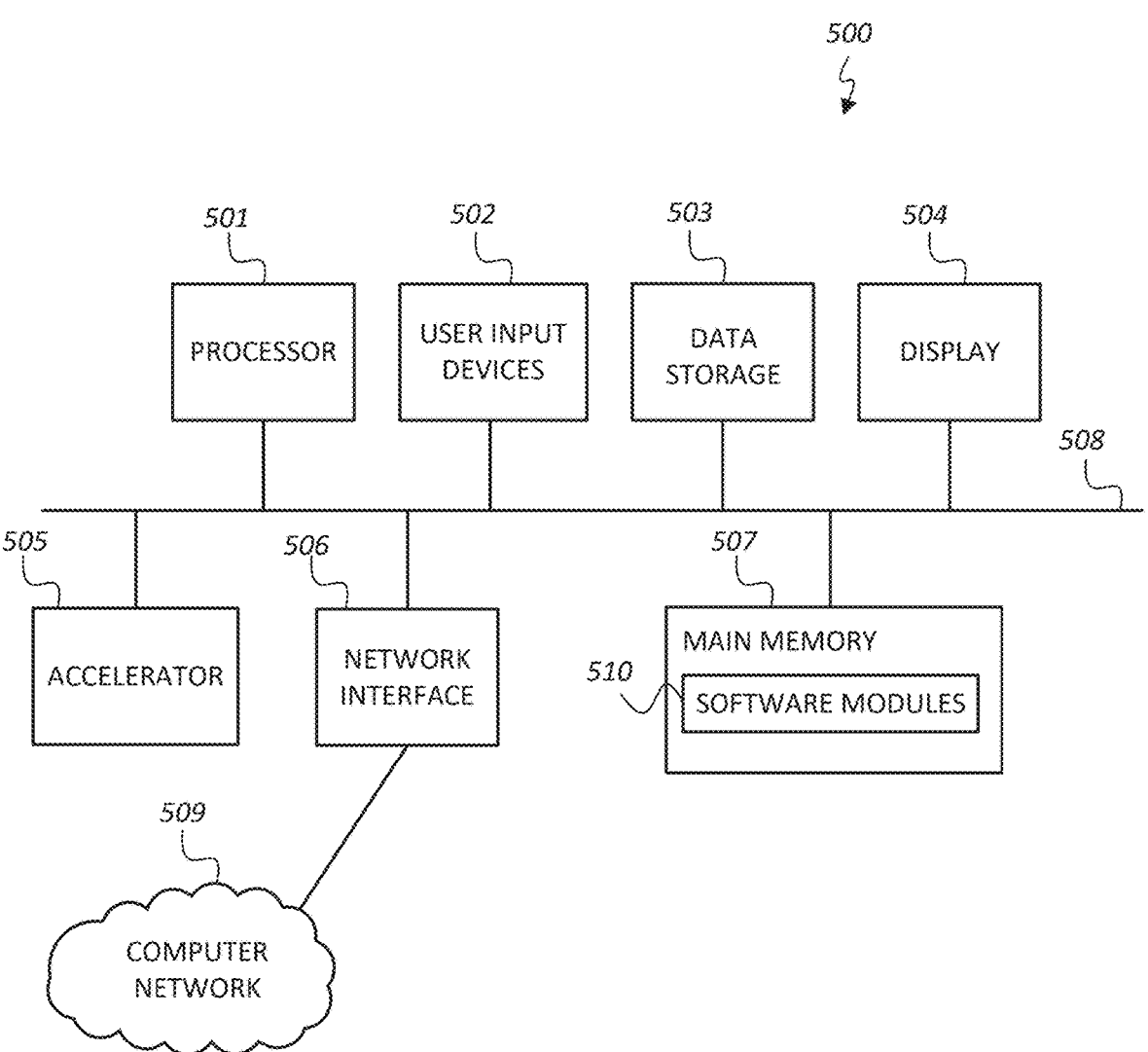
FIG. 16 shows a block diagram of a computer system that may be employed with embodiments of the present invention.

FIG. 16 shows a block diagram of a computer system 500 that may be employed with embodiments of the present invention. The computer system 500 may be employed as a backend system or other computer described herein. The computer system 500 may have fewer or more components to meet the needs of a particular application. The computer system 500 may include one or more processors 501, one or more user input devices 502 (e.g., keyboard, mouse), one or more data storage devices 503 (e.g., hard drive, optical disk, solid state drive), a display screen 504 (e.g., liquid crystal display, flat panel monitor), one or more accelerators 505 (e.g., graphics processing unit (GPU), neural processing unit (NPU)), a computer network interface 506 (e.g., network adapter, modem), and a main memory 507 (e.g., random access memory). The computer system 500 may have one or more buses 508 coupling its various components. The computer network interface 506 may be coupled to a computer network 509, which in this example includes the public Internet.

The computer system 500 is a particular machine as programmed with one or more software modules 510, comprising instructions stored non-transitory in the main memory 507 for execution by at least one processor 501 to cause the computer system 500 to perform corresponding programmed steps. An article of manufacture may be embodied as computer-readable storage medium including instructions that when executed by at least one processor 501 cause the computer system 500 to be operable to perform the functions of the one or more software modules 510. In one embodiment, the software modules 510 comprise instructions of a cross-source alignment analyzer.

While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of analyzing online content for misinformation, the method comprising:

generating a first search query using a target text of an online content from a website on the public Internet;

performing an online search using the first search query to generate a first set of search results;

using a language model to generate a contradictory form of the target text, wherein a first text alignment indicator of the target text and the contradictory form of the target text is below a threshold, the first text alignment indicator indicating a degree by which factoids of the target text is in alignment with factoids of the contradictory form of the target text;

generating a second search query that has the contradictory form of the target text;

performing an online search using the second search query to generate a second set of search results;

generating a second text alignment indicator for each of collected news articles from the first and second sets of search results, the second text alignment indicator for each of the collected news articles indicating a degree by which factoids of a collected news article align with the factoids of the target text; and detecting misinformation in the online content based at least on corresponding second text alignment indicators of the collected news articles.

2. The method of claim 1, further comprising:

selecting a predetermined number of search results from the first set of search results to generate a third set of search results; and selecting a predetermined number of search results from the second search results to generate a fourth set of search results, wherein the collected news articles are from the third and fourth sets of search results.

3. The method of claim 1, further comprising:

for each of the collected news articles, determining a category of the target text, determining a category of the collected news article, and discarding the collected news article responsive to the target text and the collected news article being in different categories.

4. The method of claim 1, further comprising:

for each of the collected news articles, determining a category of the target text, determining a category of the collected news article, and determining whether the news article is relevant to the target text responsive to the target text and the collected news article being in a same category.

5. The method of claim 4, further comprising:

generating a shared alignment score that indicates a degree by which the collected news articles as a group aligns with the target text;

detecting misinformation in the online content based at least on corresponding text alignment scores of the collected news articles and the shared alignment score.

6. The method of claim 1, wherein the online content is from a webpage of the website and the webpage is rendered by a web browser of a user computer.

7. A system for checking online content for misinformation, the system comprising:

a user computer comprising at least one processor and a memory, the memory of the user computer storing instructions that when executed by the at least one processor of the user computer cause the user computer to:

receive online content from a website on the public Internet; and forward a target text of the online content from the user computer to a backend system; and the backend system comprising at least one processor and a memory, the memory of the backend system storing instructions that when executed by the at least one processor of the backend system cause the backend system to:

generate a first search query using the target text;

perform an online search using the target text to generate a first set of search results;

use a language model to generate a contradictory form of the target text, wherein a first text alignment indicator of the target text and the contradictory form of the target text is below a threshold, the first text alignment indicator indicating a degree by which factoids of the target text and factoids of the contradictory form of the target text is in alignment;

generate a second search query using the contradictory form of the target text;

perform an online search using the second search query to generate a second set of search results;

generate a second text alignment indicator score for each of collected news articles from the first and second sets of search results, the second text alignment indicator indicating a degree by which factoids of a collected news article aligns with the factoids of the target text;

generate a shared alignment indicator score that indicates a degree by which factoids of the collected news articles as a group aligns with the factoids of the target text; and provide second text alignment indicators of corresponding collected news articles and the shared alignment indicator to the user computer to detect misinformation in the online content.

8. The system of claim 7, wherein the instructions stored in the memory of the backend system when executed by the at least one processor of the backend system cause the backend system to:

select a predetermined number of search results from the first search results to generate a third set of search results; and select a predetermined number of search results from the second search results to generate a fourth set of search results, wherein the collected news articles are from the third and fourth sets of search results.

9. The system of claim 7, wherein the online content is from a webpage of the website and the webpage is rendered by a web browser of the user computer.

* * * * *